Aug. 15, 1961     H. E. HINES     2,995,755
CONTAINER MANUFACTURING
Filed March 26, 1956     6 Sheets-Sheet 1
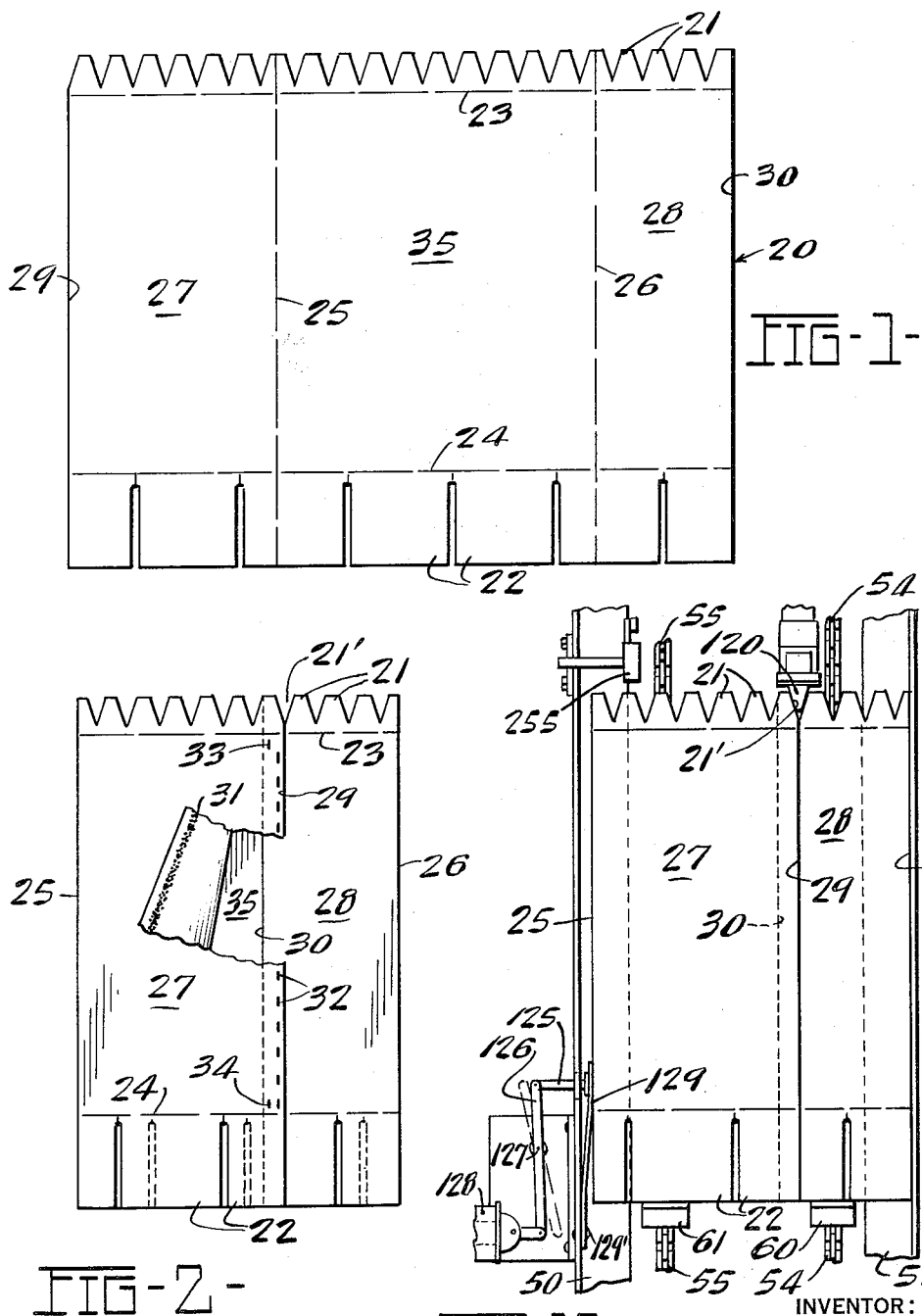
INVENTOR:
HARRY E. HINES.
BY Hugh A. Kirk
ATTORNEY Aug. 15, 1961  H. E. HINES  2,995,755
CONTAINER MANUFACTURING
Filed March 26, 1956  6 Sheets-Sheet 2
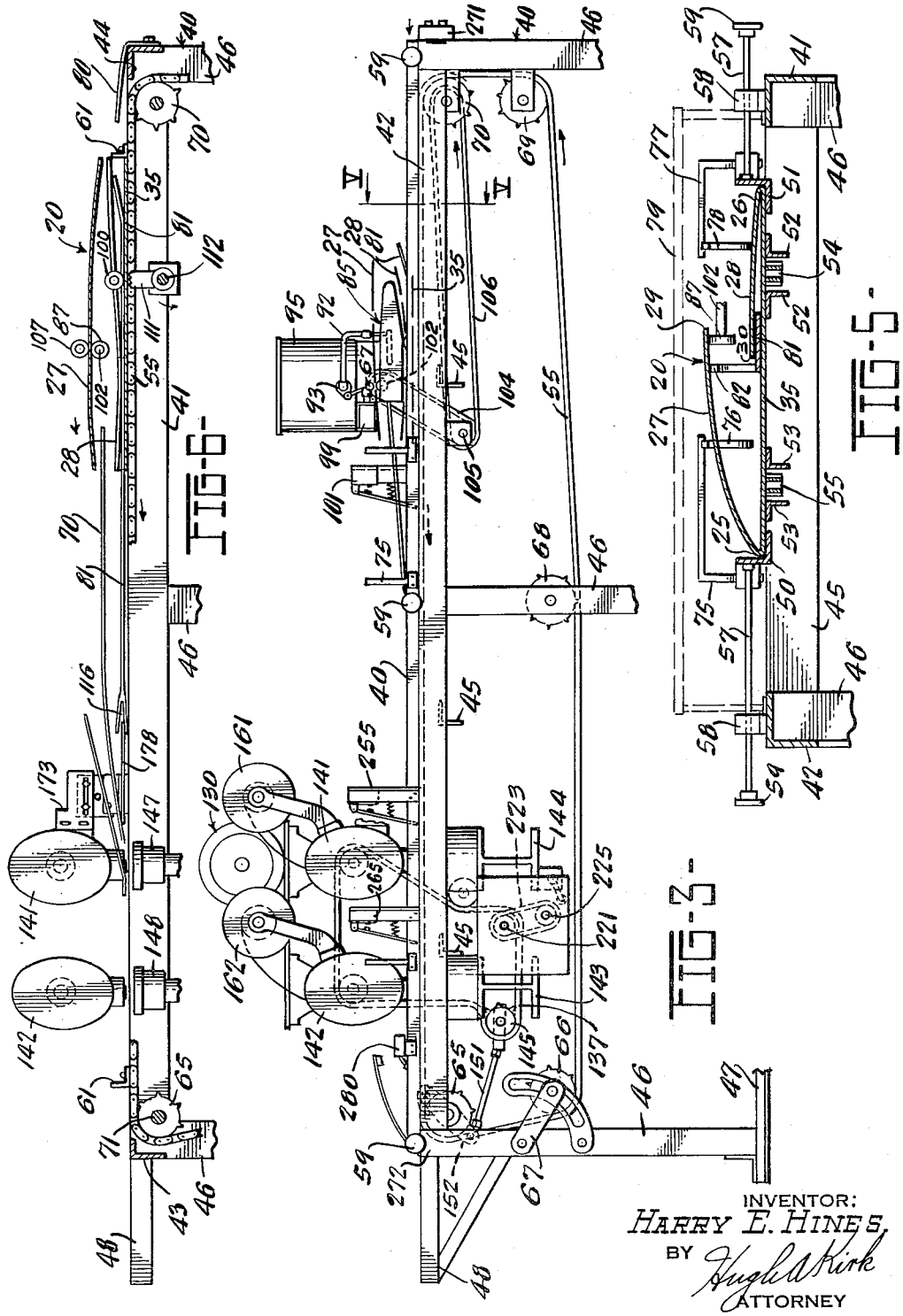
INVENTOR:
HARRY E. HINES,
BY Hugh A Kirk
ATTORNEY

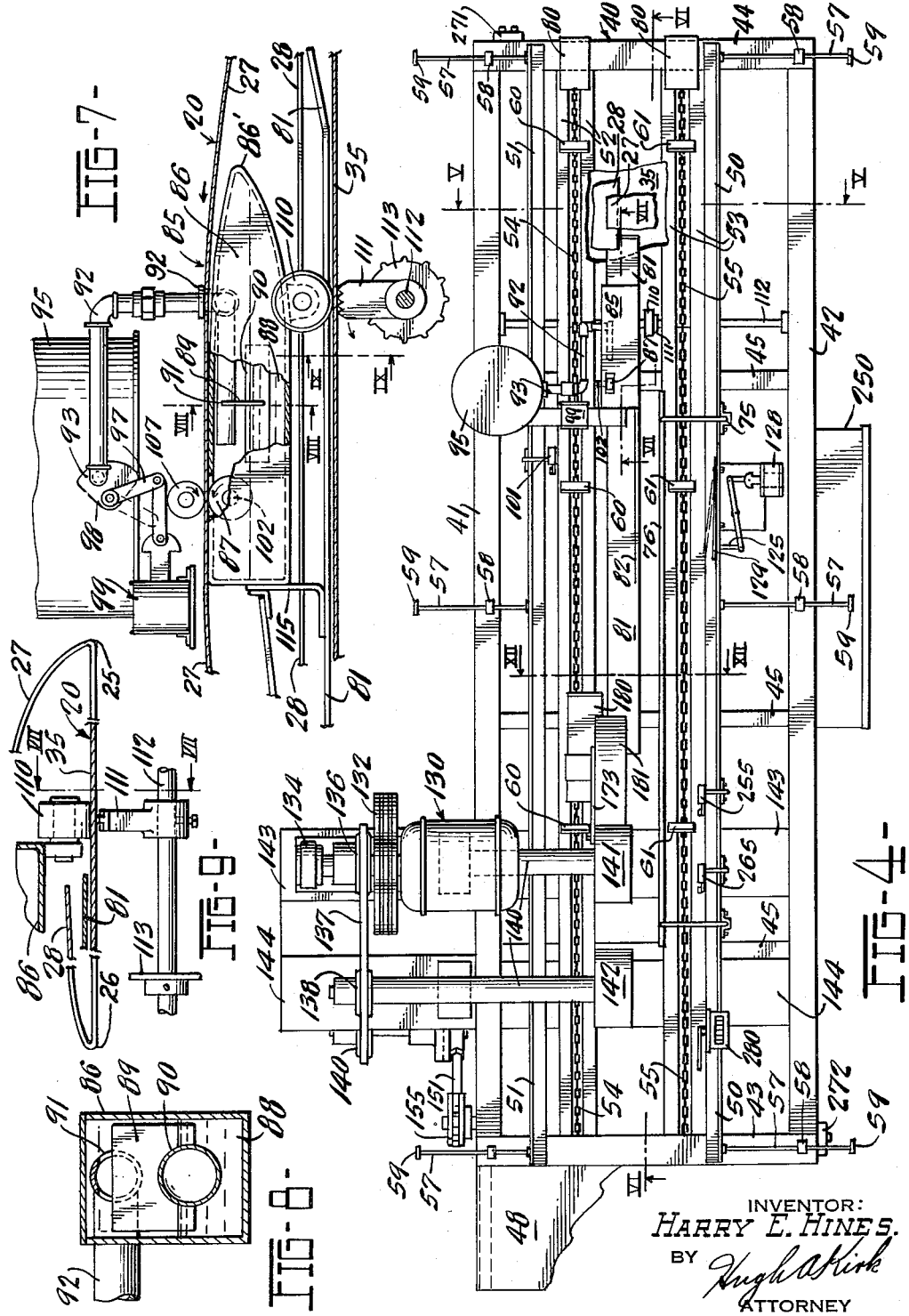

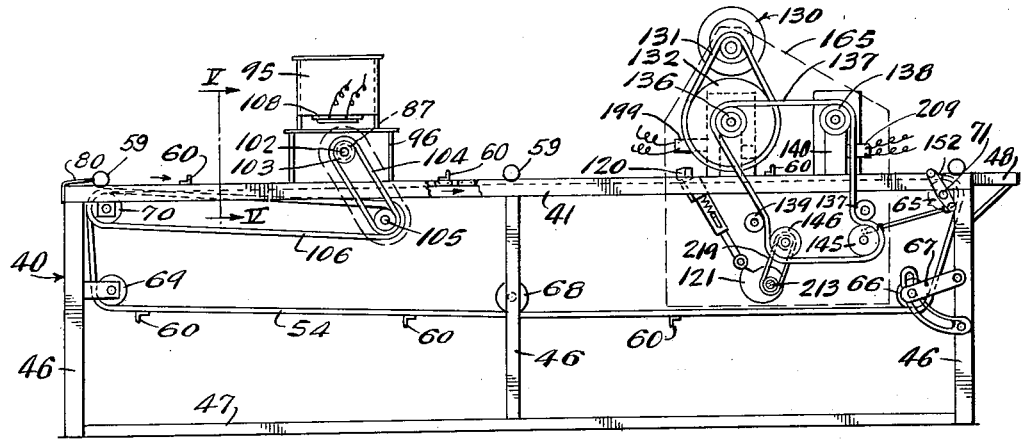
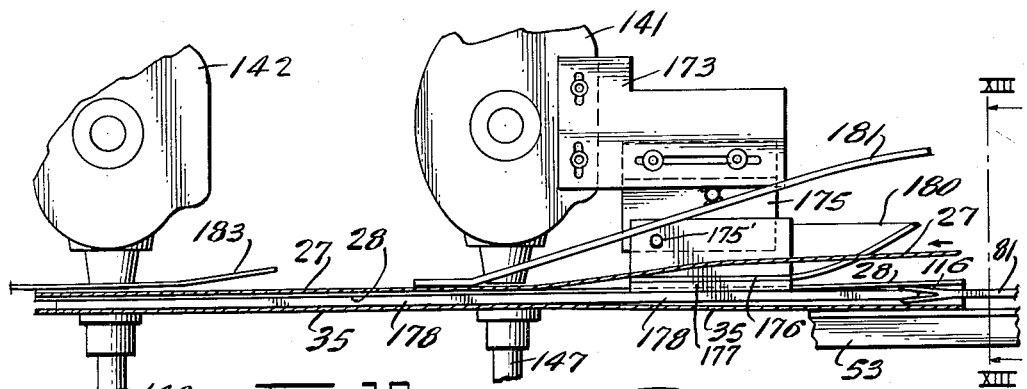
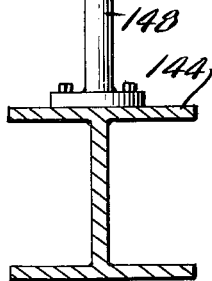
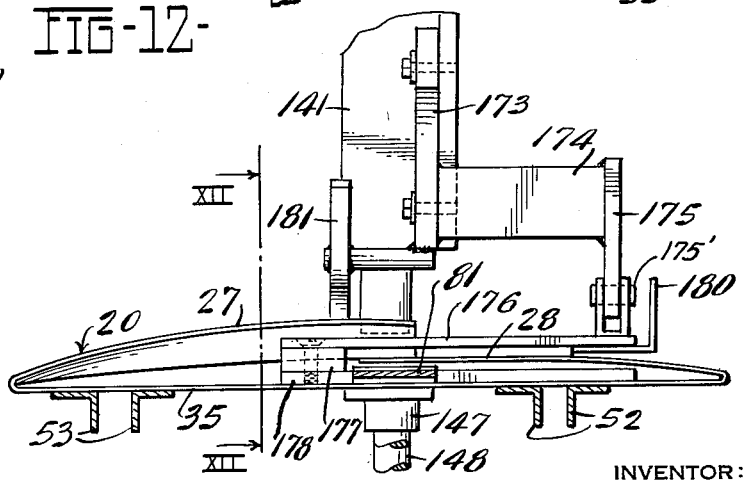
INVENTOR:
HARRY E. HINES,
BY
ATTORNEY

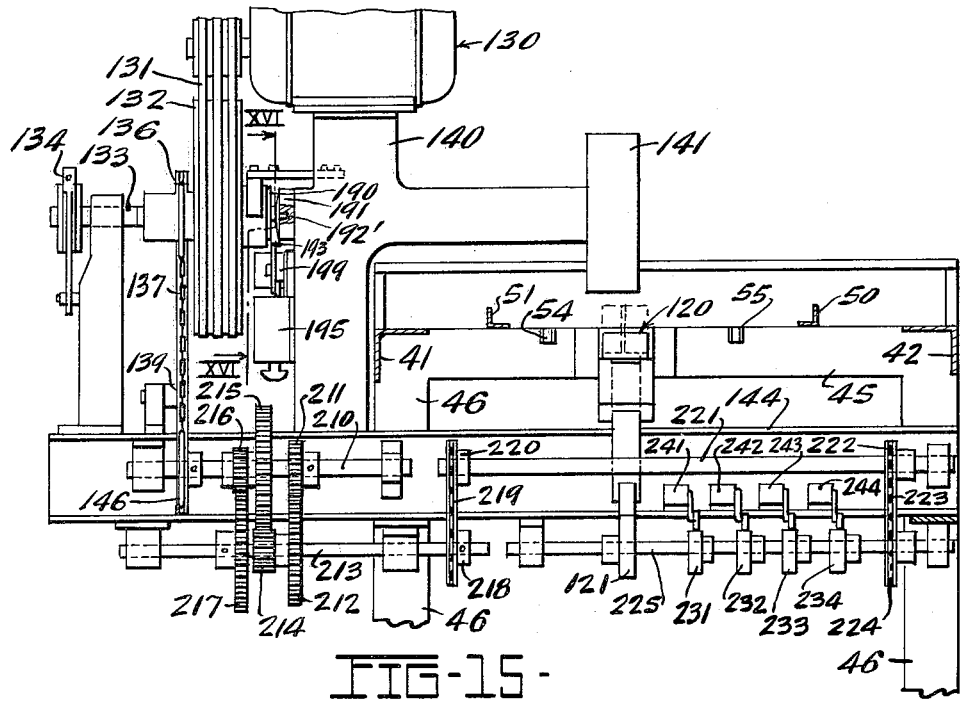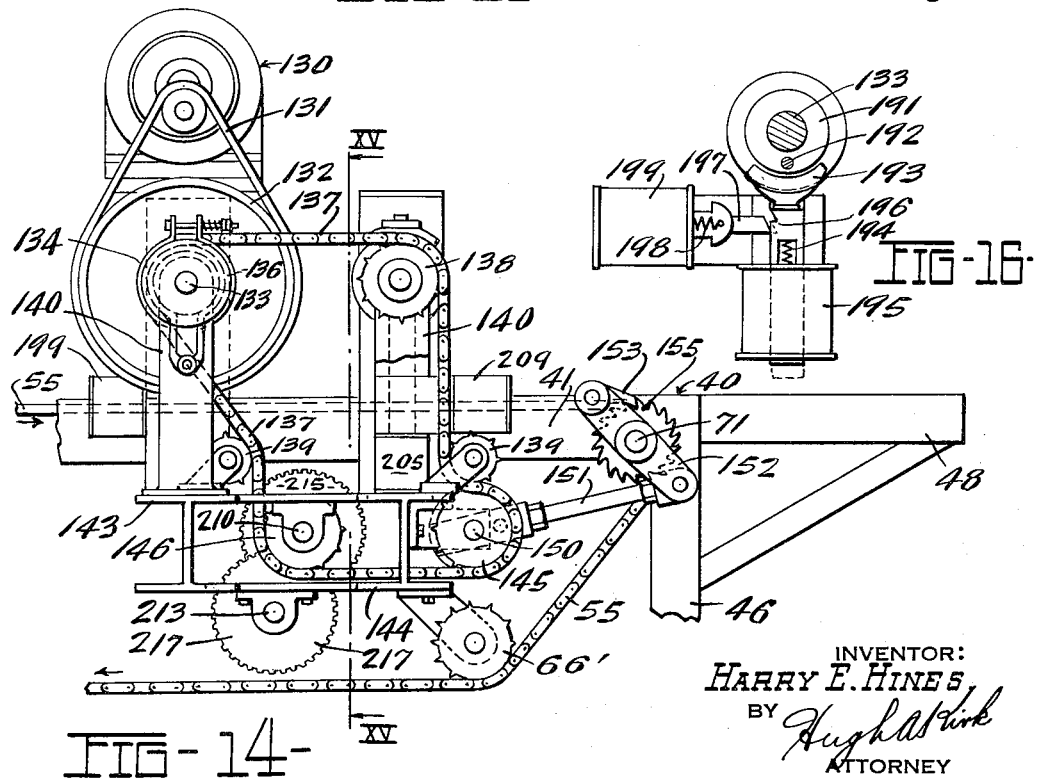

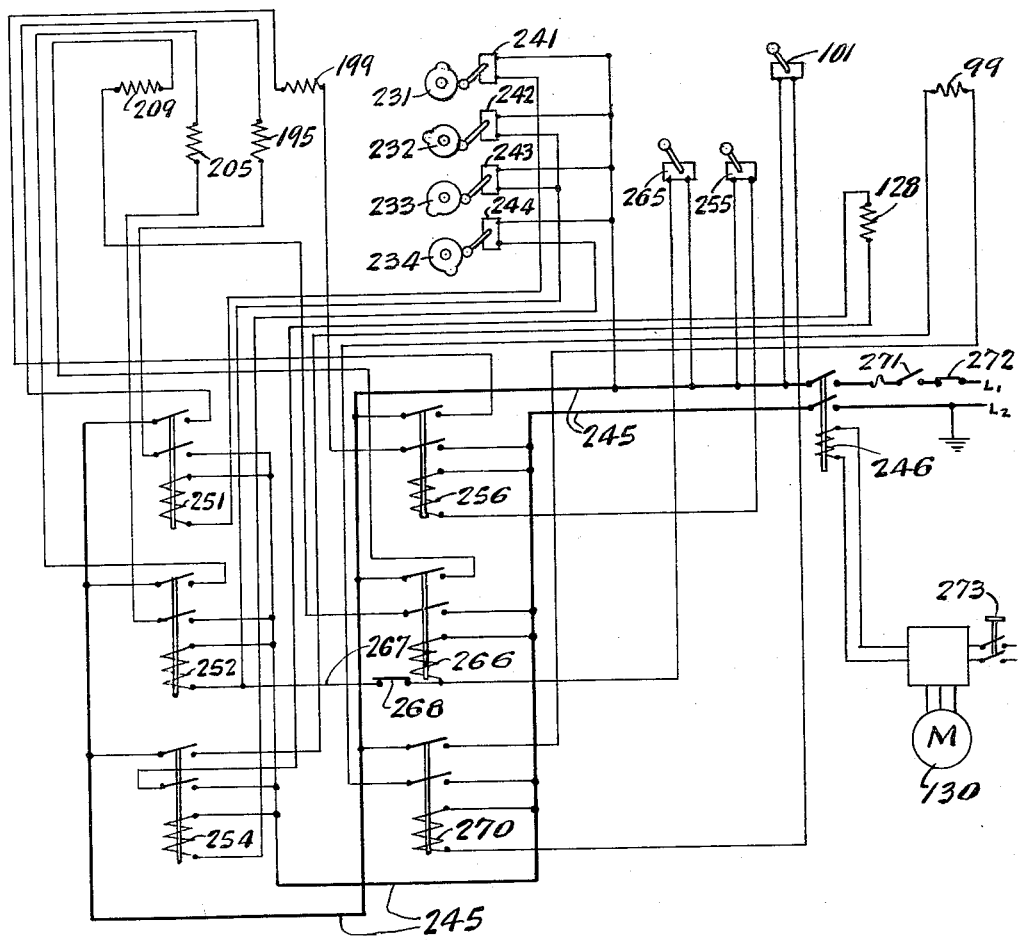
FIG-17-

United States Patent Office 2,995,755
Patented Aug. 15, 1961

2,995,755
CONTAINER MANUFACTURING
Harry E. Hines, Monroe, Mich., assignor to Consolidated Paper Company, Monroe, Mich., a corporation of Michigan
Filed Mar. 26, 1956, Ser. No. 573,878
12 Claims. (Cl. 1—97)

This invention relates to a method and machine for manufacturing a container. More particularly it deals with at least the partial manufacture of a container from sheet stock, such as fiber board, by fastening two opposite edges of pre-cut container blank sheets together to form collapsed open ended tubular containers readily adapted for compact storage and transportation to the place where they are to be used. For example, such containers include tubular coated drum type containers for asphalt and like materials, which materials may be placed while hot and in liquid form into such drum containers for later solidification when they have cooled.

The invention of this application is a continuation-in-part of Harry E. Hines U.S. copending patent application Serial No. 459,915, filed October 4, 1954 (now abandoned).

It is an object of this invention to manufacture such containers in a simple, efficient, effective, rapid and accurate manner.

Another object is to manufacture such containers from pre-formed blanks into collapsed tubes by accurately and securely fastening together two opposite edges of the blanks.

Another object is to produce such a container in which the fastening of the two opposite edges is reinforced at least at the ends of the edges.

Another object is to manufacture such a container in which the joint of fastening of the two opposite ends of the container blank is substantially liquid leak proof.

Another object is to provide an automatic machine for manufacturing such containers.

Another object is to manufacture a container from blanks in such a machine which not only automatically feeds the blanks successively through the machine in synchronism with the forming operations of the machine, but also operates in response to the presence of each container blank in the machine.

Another object is to provide such a machine which automatically aligns the blanks in the machine before they are subjected to the forming operations.

Generally speaking, the method and machine of this invention comprises at least partially manufacturing the container from a preformed blank by fastening together two opposite edges of the blank to form a collapsed tubular container. The machine comprises at least one stapler or stitcher and a step-by-step conveyor driven in synchronism with the operation of the stapler, for conveying the container blanks through the machine. Pre-cut sheet container blanks are fed into one end of the machine where its opposite edges are folded toward each other over the top of the central portion of the container blank, and the overlapping edges of the folded over portions are aligned and guided through the machine so that they can be stitched or stapled together, such as by a row of spaced staples along and through said overlapping edge portions.

An additional one or more stitchers or staplers may also be used in the machine to either produce a tie or additional stitch or staple at each end of the row of staples along the fastened overlapping edge portions, or produce a second or additional row of stitches or staples parallel to the first row thereof either in alignment or staggered therewith. The conveyor is so synchronized with the stitchers or staplers, that it moves only in between the times each stitch or staple is being inserted in the blank.

An important feature of this invention comprises movable means for the automatic alignment of the overlapping edge portions of the blank just before they are fastened together, as well as the alignment of the entire blank itself on the conveyor.

In order to insure a liquid tight fastening of the overlapping edge portions, they also may be glued or have an adhesive and/or calking compound applied between them before they are stapled. This adhesive and/or calking applicator preferably applies the adhesive in a liquid form and may include means for maintaining the adhesive heated and also special automatically controlled valves for its supply from a reservoir only when a blank passes through the machine together with means to maintain a constant liquid adhesive level in the applicator itself.

The machine is adjustable for forming various different size, length and width container blanks, and may also include a means for marking or embossing each blank as it passes through the machine.

All of the moving parts of the machine are synchronized with each other and are preferably driven from the same power source or motor, and includes gearing, cams, electrical circuitry, solenoids, safety control switches, and the like.

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a plan view of a blank of one form of container manufactured by the machine of this invention;

FIG. 2 is a partially assembled collapsed tubular container formed from the blank of FIG. 1, with a portion of one of the fastened opposite edges torn away to show the adhesive applied thereto;

FIG. 3 is a side elevation of one embodiment of a machine according to this invention embodying an adhesive applicator, aligners, two staplers, and synchronizing mechanisms.

FIG. 4 is a plan view of the machine shown in FIG. 3;

FIG. 5 is an enlarged sectional view of the machine shown in FIGS. 3 and 4 taken along line V—V thereof, with some of the parts removed and including a dotted modification of structure;

FIG. 6 is a longitudinal vertical section taken along line VI—VI of FIG. 4 with a container blank in the adhesive applicator and the guide for the blank as it approaches the first stapler;

FIG. 7 is an enlarged vertical section taken along line VII—VII of FIG. 4 showing the adhesive applicator and an embosser with a portion of a container blank therein;

FIG. 8 is an enlarged vertical section taken along line VIII—VIII of FIG. 7 showing the control cut-off valve for maintaining a given level of adhesive in the adhesive applicator;

FIG. 9 is a vertical section taken along line IX—IX of FIG. 7 of the embosser;

FIG. 10 is a plan view of the folded container blank aligning means on the conveyor just before the blank is to be stapled;

FIG. 11 is a slightly reduced side elevation of the other side of the machine from that shown in FIG. 3 with some parts removed for illustrating the synchronized driving means for the conveyor, staplers, adhesive applicator, and overlapping edges aligning means;

FIG. 12 is an enlarged side elevation taken along line XII—XII of FIG. 13 of the two stitchers shown in FIG. 6 illustrating how the overlapping portions of the folded container blank are guided together and held against a clinch plate under both stapling machines;

FIG. 13 is an end view taken along line XIII—XIII of FIG. 12;

FIG. 14 is an enlarged side view of the stitcher and conveyor driving means shown in FIG. 11;

FIG. 15 is a vertical section taken along line XV—XV of FIG. 14 showing the gearing and cams for controlling electrical switches for the synchronization of the operations of the machine;

FIG. 16 is an enlarged side elevation taken along line XVI—XVI of FIG. 15 showing a clutch and its operating mechanism engaging a stapler in synchronism with the conveyor; and FIG. 17 is one embodiment of a wiring diagram of the electrical circuit for controlling the operation of the machine of this invention.

I. Container blank

Although many different types of containers may be at least partially assembled on the machine of and by the method of this invention, the particular type of container chosen herein for the illustration of this invention is a collapsed tubular drum type container in which the cylindrical part of the container is formed into a collapsed tube from a flat preformed blank 20 as shown in FIG. 1. This particular blank of fiber board or the like has a series of small flaps 21 separated by V-notches along the container's bottom edge and a series of larger rectangular flaps 22 along its top edge, which top and bottom flaps may be separated from the body of the blank 20 by score lines 23 and 24, respectively, which eventually may form the bottom and top circular edges of the drum when it is filled. Perpendicular to this parallel pair of score lines 23 and 24 is another pair of score lines 25 and 26, along which the opposite end portions 27 and 28 of the blank 20 are folded toward each other, so that their corresponding opposite edges 29 and 30 of the blank sheet will overlap slightly as shown in the completed collapsed container tube shown in FIG. 2. The overlapping portions of the edges 29 and 30 may have an adhesive, glued or calked strip 31 applied between them before they are stapled together by at least one row of staples 32, and two additional end or tie staples 33 and 34 adjacent the crease lines 23 and 24 at the top and bottom of the container blank to reinforce the fastening strip and prevent it from being torn apart in the event that the overlapping edges of the end flaps 21 and/or 22 become separated or unglued.

It is advantageous that one end of the overlapping edges of the container blank have specially formed alignable beveled sides on the flaps 21, such as V-shaped notches 21' so that they may be accurately aligned for stapling by a movable or retractable aligning means 120 as shown in FIG. 10 and described later in Section IV. The central plane back or unfolded body portion 35 of the container blank 20, is the portion of the blank which rests on the conveyor chains 54 and 55 and guides 50 and 51 (described in the next section II) of the machine and partly shown in FIG. 10.

II. Machine frame, conveyor and guides

Referring now to FIGS. 3 and 4, one embodiment of the machine of this invention comprises a frame in the form of a platform or table 40 which may be made out of strips of angle iron fastened together to form sides 41 and 42, ends 43 and 44, cross pieces 45, and legs 46 which legs may be held together along the floor by members 47 to give rigidity to the whole frame. At the container discharge end of the table 40 there may be provided an extension leaf 48 which may be braced against the adjacent legs 46 to support the manufactured container or carton until it has passed completely through the last stitcher or stapler.

Longitudinally along the top of the table 40 are provided a pair of laterally adjustable guide rails or strips 50 and 51 of L-shaped cross-section (see particularly FIGS. 4 and 5) which are spaced to support and guide the folded edges of the container blanks along their score lines 25 and 26 as they are moved through the machine from the right to the left or along the top of the table 40 shown in FIGS. 3 and 4. The blanks 20 are thus placed with their larger flap portions 27 spaced above the shorter flap portions 28 as shown in FIG. 5 with their central back sections 35 resting on guides including the conveyor chain guides 52 and 53 for the pair of conveyor sprocket chains 54 and 55, whose top surfaces are in the same plane with the supporting parts of the guides 50 and 51 as shown in FIG. 5. The lateral adjustability of the guides 50 and 51 for adapting the machine to handle different width blanks, may be provided by long bolts 57 which turn in the nuts 58 fixedly mounted on the side members 41 and 42. These long bolts may be provided with enlarged heads forming manually adjusting knobs 59.

The conveyor comprises a pair of parallel endless chains 54 and 55 upon which are mounted container blank aligned pusher flights or dogs 60 and 61, respectively, at adjustably spaced intervals as shown in FIG. 4, each pair of which flights engage the top edge of each successive blank against the end of its flaps 22 to push it along the table 40 or through the machine. The flights 60 and 61 also support their corresponding conveyor chains 54 and 55 on the guides 52 and 53 (see FIG. 4) in their movement across the top of the table 40. The chains 54 and 55 at the container discharge end of the table 40 extend over sprocket wheels 65 and then spaced downwardly therefrom around fixed (see sprocket wheels 66' in FIG. 14) or adjustable idler sprocket wheels 66 which may be mounted separately and guided by levers 67 pivoted to adjacent table legs 46 to tension the chains 54 and 55, thence under idler sprocket wheels 68 in the center of the table, over lower end sprocket wheels 69, up to the feeder end sprocket wheels 70 and back again to sprocket wheels 65. The sprocket wheels 65 may be mounted rigidly on a driving shaft 71 which shaft is intermittently or step-by-step rotated for driving the conveyor as will be described later in section V.

Attached either to the sides 41 and 42 of the table or to the edges of the adjustable guides 50 and 51, there are preferably provided overhanging brackets with blank flap guiding bars or strips, such as brackets 75 connected to guide rail 50 as shown in FIGS. 3, 4 and 5 suspending the guiding bars or rods 76 under which rods the flaps 27 of the container blank 20 slide to maintain them in their folded over positions as they pass along the conveyor to and past the stitchers or staplers at the end of the table 40. A similar bracket 77 is shown in FIG. 5 with a guide bar 78 for the flaps 28 of the blanks 20, which is mounted on adjustable guide rail 51. For clarity other similar brackets and guide rails or bars which should be mounted along the machine have been omitted in the drawings. If desired, these guide rod supporting brackets may be replaced by table bridging members 79, as shown in dotted lines in FIG. 5, which may be fixedly mounted on posts connected to the rigid sides 41 and 42 of the table 40.

At the right or feeder end of the table 40 of the machine shown in FIGS. 3, 4 and 6, the blanks 20 may be manually folded along their score lines 25 and 26 when fed to the machine so that the flaps 27 are above flaps 28, and then manually fitted in between the guides 50 and 51 and over conveyor flight protectors or guards 80 (see FIGS. 4 and 6), with the front end of the shorter and lower flaps 28 sliding under the guide rail 78 and the front end of the longer and upper flaps 27 sliding under the guide rail 76 (see FIG. 5).

Along and above the center of the path of the container blanks 20 through the machine is a separator strip 81 which may be suspended from the adhesive applicator mechanism 85 described in the next Section III, which strip 81 extends between and below both of the overlapping edge portions and above the central back portions 35 of the blanks 20. Mounted along a portion of one edge of this strip 81 beyond the outer edges 30 of the shorter flaps 28 and below and spaced inwardly from the outer edges 29 of the upper and longer flaps 27 is an upwardly projecting rail 82 (see FIG. 5) to maintain the upper overlapping flap edges 29 spaced from the lower flap edges 30 to permit the application of the adhesive on the under side of the upper flap edges of each blank 20 (such as by a knurled roller 87 of the adhesive applicator 85), and to maintain it so separated until the two overlapping edges 29 and 30 are ready to be stapled together.

III. Adhesive applicator and marker

After the folded container blank 20 has been inserted into the machine and picked up by the conveyor pusher dogs 60—61, its first step towards the manufacture of the collapsible tubular container may comprise the application of a strip 31 of an adhesive and/or calking material to the under side of the flap 27 near its edge 29, which is done herein by a liquid adhesive applicator or gluer apparatus 85 shown in FIGS. 3, 4, 6, 7 and 8.

Referring more specifically to FIGS. 7 and 8, this apparatus 85 may comprise an elongated hollow chamber 86 having a wedge shaped forward end 86' for fitting in the space between overlapping portions of the flaps 28 and 27. In this chamber 86 may be journalled a knurled or roughened applicator roller 87 the lower edge of which dips into the adhesive liquid 88 to be applied. This liquid 88 may be maintained in the chamber 86 at a given level to prevent flooding the roller 87, by means of a float operated intake gate valve which may comprise a gate cut-off plate 89 mounted on a float 90 which plate 89 operates in a slot 91 in the liquid adhesive intake duct 92 that extends into the side of the chamber 86. This duct may contain a solenoid operated gate valve 93 and is connected to an adhesive supply reservoir 95 which may be mounted above the table 40, such as by bracket 96 as shown in FIG. 11. The solenoid operated gate valve 93 is shown herein to be controlled by a lever 97 and link 98 connected to solenoid 99 which may be energized by the operation of an electric micro-switch 101 mounted on guide rail 51 and operated by a pivoted feeler which is moved in response to each carton or container blank 20 that passes by it through the machine. Thus, only when a container blank 20 is present is the valve 93 opened by moving the link 97 into its dotted line position shown in FIG. 7, and its liquid adhesive permitted to flow through the duct 92 into the chamber 86, which flow then is controlled by the gate valve 89 just described. The application roller 87 is preferably positively driven through a shaft 102 extending out the side of the chamber 86 to a pulley 103 (see FIG. 11) which may be connected by a belt 104 to an idler shaft 105 mounted below the table 40. This shaft 105 may be driven by another belt or chain 106 to a gear or pulley mounted on the shaft with sprocket wheels 70 for the conveyor chains 54 and 55, so that the applicator roll 87 will be driven by and in synchronism with the conveyor. Mounted above the applicator roll 87 may be a pressure or guide wheel 107 (see FIG. 7) for insuring contact of the flap 27 with the top of the knurled applicator roller 87.

If desired, the adhesive may also include a calking compound which may be suspended or dissolved therein to seal any crevices or holes made in the overlapping edge portions of the blank 20 by the staples or stitches applied thereto later in the machine. The adhesive reservoir 95 may be heated by an electric heater 108 as shown in FIG. 11 so as to keep the adhesive and/or calking liquid sufficiently fluid to flow through the duct 92 for ready application by the roller 87.

Also if desired, a marking, embossing or imprinting mechanism may be mounted beneath the table such as that shown in FIGS. 7 and 9 which may comprise a pressure or guide roller 110 that may be mounted on the bottom of the chamber 86 to roll on the upper surface of the central back portion 35 of the blank 20 opposite the embossing lever 111 mounted on a shaft 112 under the table 40. This shaft 112 may be driven by a gear or sprocket wheel 113 connected to the driven shaft 105, or to the shaft of sprocket wheels 68 (not shown), for the applicator to be in synchronism with the conveyor so that once each time a carton or container blank passes through the embosser, the outer end of the lever 111 will mark the under side of the blank 20 or outside of the portion 35 of the container.

The separator strip 81 previously mentioned which extends between the overlapping edge portions of the flaps 27 and 28 of the blanks 20, is shown in FIG. 7 to be mounted on a bracket 115 suspended from the adhesive applicator chamber 86, and in FIGS. 4, 6 and 12 this strip is shown to extend substantially to the first stapler 141 described in Section V below, where it is provided with a forked end 116 to engage the end of the anvil or crimping plate extending below the staplers.

IV. Container blank aligners

After the container blank 20 has had the adhesive strip 31 applied to it, and before it is introduced into the first stitcher 141 described in the next section V, the folded and glued blank is accurately aligned by two separate movable aligning means as shown in FIG. 10.

In order to insure accurate alignment of the overlapping portions of edges 29 and 30 of flaps 27 and 28, respectively, there is provided a retractable tooth or stop 120 which is extended upwardly during the rest period between two successive steps of movement of the conveyor chains 54 and 55, to fit into the notch 21' shown in FIG. 10. This stop 120 may be operated directly by a cam 121 (see FIG. 11) on a cam shaft driven in synchronism with the conveyor as will be described later in section VII.

As soon as the stop or overlapping edges alignment device 120 is operated, a second aligning device is operated for the same container blank, which second device comprises a blank aligning pusher 125 (shown in FIGS. 4 and 10) connected, by a lever 126 pivoted at 127, to an armature of a solenoid 128, which solenoid is energized immediately after the stop 120 is extended as shown in FIGS. 10 and 11. The energization of the solenoid 128 causes the pusher 125 to push against a leaf spring or flexible strip 129 anchored at one end 129' to the guide 50, which pushes the free end of of the strip 129 against edge 25 of the blank near its end away from the stop 120, and thereby pushes the whole container blank 20 over against and parallel to the guide rail 51, so that in combination with operation and holding of the overlapping edges by the stop 120, an accurate alignment of the edge portions to be stapled or stitched is insured, as well as insuring the tie staples 33 and 34 or a second row of staples to be parallel with the edges 25, 26, 29 and 30 and the first row of staples 32. The pushing leaf strip 129 is shown unoperated in its full line position in FIG. 4, while it is shown operated in its full line position in FIG. 10.

V. Power driving mechanism

A single power source or electric motor 130 (see FIGS. 11, 14 and 15) for the whole machine may be mounted above the first stapler, which motor herein is shown to be connected by belts 131 to a driving pulley 132 which may be mounted on the main drive shaft 133 of the first stapler 141 and connected to said shaft 133 by a clutch mechanism as shown in FIG. 16 and described later. The shaft 133 also may have mounted thereon a friction brake 134 to prevent over-riding of the stapler 141 when it is disengaged by said clutch mechanism. Connected with pulley 132 may be a driving sprocket wheel 136 which through an endless sprocket chain 137 drives another sprocket 138 for operating the second or tie stapler device 142, and then passes around idler pulleys 139, a conveyor crank driving sprocket wheel 145 and cam shaft driving sprocket wheel 146.

The driving sprocket chain 137 rides on its cooperating sprocket wheels, which sprocket wheels are mounted on separate shafts on a frame 140 anchored or attached to the table 40. This frame 140 overhangs one edge of the table so that the staplers 141 and 142 can overhang the table and be in alignment with the overlapping edge portions of the container blanks 20 passing through the machine. The base of the frame 140 may comprise a pair of I-beams 143 and 144 which extend beyond one side of and transversely underneath the top of the table 40 (see FIG. 15) for connecting the staplers 141 and 142 in a unit structure with their corresponding anvils 147 and 148 (see FIG. 12).

The conveyor drive sprocket wheel 145 is mounted on a shaft 150 (see FIG. 14) which has keyed thereto an adjustable crank arm and connecting rod 151 for operating a rocking lever 152 carrying at one end a pivoted pawl or ratchet 153 which engages a ratchet wheel 155 connected to the driving shaft 71 to which the driving sprocket wheels 65 for the conveyor chains 54 and 55 are keyed. Thus, each rotation of the sprocket wheel 145 moves the crank arm and connecting rod 151 to ratchet the ratchet wheel 155 one or more notches depending upon the adjustment of the crank arm and the size of the blank of the container being manufactured.

Above each of the staplers 141 and 142 may be provided auxiliary reels 162 of wire or the like as shown in FIG. 3 to be employed for the stitching or stapling. The whole driving mechanism and sprocket chain 137 may be covered over with a housing 165 as shown in dotted lines in FIG. 11.

VI. Staplers

Attached on to the housing of first stapler 141 may be an adjustably mounted bracket 173 (see FIGS. 6, 12 and 13) to which is mounted an offset extension 174 carrying a downwardly extending plate 175 and pin connection 175′ for removably mounting an anvil supporting plate 176 which extends transversely between the overlapping edge portions 27 and 28 of the container blank 20; then from the underside of the plate 176 there may be a further downwardly extending member or spacer block 177 for supporting the anvil or clinch plate 178 that extends along and underneath both the overlapping edge portions 27, 28 and the staplers 141 and 142 (see FIG. 12) from the forked end 116 of the separator strip 81 to beyond the stapling device 142 and its anvil 148. This clinch plate 178 prevents the staples that are pushed through the overlapping edge portions by the staplers 141 and 142 from piercing through the central back portion 35 of the container blank. Below this back portion 35 and each of the staplers 141 and 142 to prevent bending or any downward movement of this plate 178, are the stationary anvils 147 and 148 mounted on the I-beams 143 and 144.

Connected to the bracket member 176 for supporting the clinching plate 178 is a guide member 180 for pressing down the flaps 28 of the blanks 20, and then connected to the bracket members 173 or 175 is an additional guide member 181 for pressing down the flaps 27 toward the flaps 28 just before they enter the staplers.

The second stapler 142 may have a similar guide member 183 connected thereto to maintain the carton collapsed during the second stitching operation. The second stapler 142 operates similar to the stitcher 141 but is synchronized by means of the cam shaft described in the next section VII to either place the tie stitches or staples 33 and 34 as shown in FIG. 2 or to make a continuous second row of stitches similar to the row 32, which may be opposite or staggered with the staples or stitches of the row 32.

Referring now to FIGS. 15 and 16 for the operation of the clutches for connecting the staplers 141 and 142 with their driving sprocket wheels 136 and 138, respectively, each said clutch may comprise a pair of disks 190 and 191, one of which contains a peg 192 and the other a hole 192′ for said peg, with one of said disks being keyed to the stapler drive shaft 133 for operating its corresponding stapler 141, and the other disk being keyed to its corresponding driving sprocket wheel 136. Between the disks 190 and 191 is a U-shaped wedge 193 which normally is engaged to separate the two disks and keep the pin of one out of the hole in the other, such as by means of a spring 194 operating against the wedge 193. To counteract the effect of this spring 194, there is provided a solenoid 195 which when energized pulls the wedge 193 out from between the plates 190 and 191 so they are pushed together by means of another spring or the like means (not shown) along the shaft 133, so that at the one point of synchronism the pin 192 will fall into its corresponding hole 192′ and start the stapler operating. This occurs only when the exact synchronized movement of the ratchet 153 for driving the conveyor driving wheels 136 and 138 is being retracted for another ratchet engagement with the ratchet wheel 155, and the conveyor is therefore at rest.

Particularly for the first stapler 141 which makes a continuous row of staples 32, there is provided a notch 196 in the plunger carrying the wedge 193 so that as soon as the relay 195 is energized to retract the wedge 193, a locking dog 197 is forced by a spring 198 into the notch 196 to maintain the wedge out of engagement between the disks 190 and 191 until a second solenoid 199 is operated for releasing the dog 197 which then releases the wedge 193 so that its spring 194 will force it between the disks 190 and 191 to disengage the first stapler. This release then occurs after the row 32 has been stapled. The second stapler clutch engagement may be similarly operated by a pair of solenoids 205 and 209 corresponding respectively to solenoids 195 and 199.

VII. Synchronization and electrical control system

Referring to FIG. 15, the synchronized control cam shaft assembly 210, 213, 221, 225 is driven by the sprocket wheel 146 connected to sprocket chain 137, and is shown mounted between the I-beams 143 and 144. This sprocket wheel 146 is keyed to a short shaft 210 to which is also keyed a small spur gear 211 that drives a larger spur gear 212 on a second idler shaft 213 mounted below shaft 210, which gear 212 rotates freely on the shaft 213 and carries with it a pinion gear 214 which drives a larger spur gear 215 mounted back and freely rotating on shaft 210. This second large spur gear 215 has connected therewith a smaller spur gear 216 which then drives a third large spur gear 217 which is keyed to the shaft 213. To this shaft 213 may then be keyed a sprocket wheel 218 which is connected by a sprocket chain 219 and then to a sprocket wheel 220 keyed to another shaft 221 which may be in line with the shaft 210 but separate therefrom. At the other end of shaft 210 is keyed a second sprocket wheel 222 and through a second sprocket chain 223 is connected to a sprocket wheel 224 mounted on a fourth shaft 225 which may be in line with the shaft 213 but separate therefrom. It is on this fourth shaft 225 that the control cams are adjustably located, and where the cam 121, previously mentioned for positively operating the tongue or tooth aligning device or stop 120 described above in section III, is located. The other cams on shaft 225 include cams 231, 232, 233 and 234 which operate respectively micro or other type of electrical switches 241, 242, 243 and 244. The reason for breaking the shafts 213 and 225 through sprocket wheels and chains 219 and 223 is to permit the easy and independent changing of the cams for different types and sizes of container blanks to be processed or manufactured, and for easy and independent changing of the speed reduction gears 211 through 217 on the shafts 210 and 213 without removing the cams 231 to 234. If a container or carton is only of a different length, it may only be necessary to change the sprocket wheels 222 and 224, but the length must be an even multiple of the number of teeth on the ratchet wheel 155 for the conveyor drive. By means of the speed reduction gears 211 through 217 shown, the shaft 213 is driven at $\frac{1}{32}$ of the speed of the drive shaft 133 or 210, so that the cam shaft 225 rotates once for the conveyor chains 54 and 55 to move the distance between two successive pairs of flights 60—61, or the distance between two adjacent container blanks passing through the machine.

The cam 231 is set for starting the first stapler 141 by energizing its control relay 251 (see FIG. 17) which may be mounted together with a plurality of other control relays on a panel in a box 250 (see FIG. 4) attached to one side of the machine. The contacts of this relay 251 control circuits to supply energy to the solenoid 195 from a 110 volt power supply line 245 which may be energized only when the driving motor 130 is energized through the means of relay 246. As previously described, solenoid 195 pulls the wedge 193 against the action of the spring 194 from the clutch for driving the first stapler 141 which clutch is then locked in its open position by the spring urged dog 197 so that it is not necessary to maintain the relay 251 energized during the whole time for making the complete row of stitches or staples 32 as shown in FIG. 2. This first stapler 141 is stopped by the energization of solenoid 199 which is caused by the closing of a container blank feeler controlled micro-switch 255 mounted on the guide rail 50 shown in FIGS. 3 and 4, which feeler switch 255 when it contacts a container blank is immediately opened and remains opened as long as the container blank passes under it, and correspondingly maintains the relay 256 deenergized during the time said blank passes under it. Thus as soon as the end of the container blank passes by the switch 255, it closes and energizes the relay 256 to close its contacts to energize the solenoid 199 which withdraws the dog 197 so the spring 194 again inserts the wedge 193 in the clutch to disengage the first stapler 141.

The second cam 232 and its corresponding micro switch 242 energizes the relay 252 which closes its contacts to energize the clutch solenoid 205 of the second stapler 142 which is operated only for the period of making one stitch or staple, in that according to the circuit as shown in FIG. 17 the opening of a second container blank feeler switch 265 (similar to switch 255), mounted along the guide rail 50 as shown in FIGS. 3 and 4, does not deenergize the corresponding control relay 266 in that it was already energized through the circuit 267 connected to the circuit of micro-switch 242 together with the energization of the relay 252. Accordingly, the corresponding locking dog 197 to the second stapler 142 will not engage the notch 196 in its clutch wedge to hold the clutch engaged, and solenoid 205 is only energized long enough for just one stapling operation gauged by shape of the cam 232. This operation inserts the first tie stitch or staple 33 shown in FIG. 2 parallel to the first staple of the row of staples 32 inserted by the first stapler 141. Now when the blank 20 passes along to the end of its row of staples 32, the third cam 233 operates the third micro-switch 243 to again energize the same relays 252 which operate to put in the second tie stitch or staple 34 at the other end of the row 32, and at the same time energize the relay 266 so that the blank feeler switch 265 still does not effect the operation of relay 266 and permits the second stapler to shut off immediately after it places the second tie staple 34 by the cam 233 opening the micro-switch 243.

The fourth cam 234 operating its micro-switch 244 energizes a control relay 254 which energizes the blank side straightener or aligner solenoid 128 shown in FIGS. 4 and 10 for aligning the next carton before it enters the first stitcher or stapler, which occurs right after the cam 121 has extended the notch stop aligner 120.

In the control panel 250 there is also an additional control relay 270 which is operated by the feeler micro-switch 101 mounted opposite the gluer or adhesive applicator 85, which in turn closes the circuit to its corresponding valve solenoid 99 as previously described in section III above.

Although FIG. 17 shows all the circuits de-energized, as soon as the relay 246 operates the relays 256 and 266 will become energized since their feeler control switches 255 and 265 are normally closed and only opened by feeling a container blank beneath them.

In FIGS. 3, 4 and 17 there is shown a manual start and stop switch 271 in the 110 volt control circuit which may be mounted on the feeding end of the machine to be operated by the person feeding the folded container blanks into the machine. Mounted on the other or discharge end of the machine is manual safety stop switch 272 which may be operated by the person unloading the machine. The motor 130 may be started and stopped by a manual switch 273 which may be mounted in the control box on the side of the motor 130 (not shown), which switch 273 when operated will correspondingly shut off the motor and de-energize the relay 246 to also shut off all the control circuits shown in FIG. 17.

If the manual switch 268 mounted in circuit 267 is opened breaking the circuit between the relays 252 and 266 so that solenoid 266 can only be operated by its container blank feeler micro-switch 265, similar to that for relay 256 operated by its feeler micro-switch 255, then the second stapler 142 will operate continuously to stitch or staple a second row of staples from the first tie staple 33 to the last tie staple 34 and be cut off similar to that of the first stapler, i.e. by switch 265 (similar to switch 255 described above); micro-switch 243 being ineffective and having no control then on this operation of the second stapler. Thus, by manually operating the switch 268 the machine and containers may be changed from two tie stitches and one row of staples 32 as shown in FIG. 2 to two parallel rows of staples all along the overlapping edges 29 and 30 of the container.

If desired, there may be mounted on one of the guide rails 50 or 51 (herein shown on rail 50 in FIGS. 3 and 4) a counter 280 to count the number of containers manufactured by the machine of this invention.

As pointed out above and illustrated in the drawings the different portions of the device are readily adjustable or interchangeable for adaption to different size and shape containers and container blanks without departing from the scope of the invention, including different combinations of stapling or stitching devices and the adhesive applicator, gluer and/or calker, as required.

While there is described above the principles of this invention in connection with specific apparatus, it is to be clearly understood that this description is made only by way of example and not as a limitation to the scope of this invention.

What is claimed is:

1. In a machine for fastening overlapped edges of a folded collapsed container blank to form a seam, the improvement comprising: a conveyor for intermittently moving said blanks through said machine, seam fastening means on the machine, a first movable means for aligning said overlapped edges for said seam before forming said seam, a side guide along said conveyor adapted to engage one of the side folds of said blank, another side guide having a second movable means mounted thereon adapted for engaging the opposite side folds of said blank for pushing said blank against the first mentioned side guide, and means for operating said conveyor, said fastening means and said first movable means and for controlling the operation of said second movable means.

2. A machine according to claim 1 wherein said first movable means for aligning said overlapping regions comprises a retractable stop, and said operating means includes a cam means to operate said stop.

3. A machine according to claim 1 wherein said fastening means comprises a stapler for stapling together the overlapped edges of said blank, and wherein said operating means for said conveyor includes means for operating said stapler.

4. A machine according to claim 1 wherein said operating means includes cams driven at the same time as said conveyor, and separate means controlled by said cams for operating both said movable means.

5. A machine according to claim 1 wherein said operating means includes a pawl and ratchet mechanism for intermittently driving said conveyor.

6. A machine according to claim 1 wherein said fastening means includes means responsive to the movement of said conveyor for applying an adhesive to at least one of said overlapped edges of said blanks, means for supplying adhesive to said applying means, and means responsive to the presence of a blank on said conveyor for controlling the flow of said adhesive to said applying means.

7. A machine according to claim 6 wherein said adhesive includes a caulking compound.

8. In a machine for fastening together the overlapping edges of a collapsed container blank and having a plurality of staplers and a step-by-step conveyor to move said blank through said machine intermittently between the operations of said staplers, the improvement comprising: a first stapler for stapling a row of staples along said overlapping edges, a second stapler spaced along said conveyor from said first stapler for stapling at least one reinforcing staple in close proximity to the staples placed by said first stapler, separate means for controlling the operation of each stapler relative to the location along said conveyor of said blank to be stapled to each stapler, and common means for driving said conveyor and both said staplers.

9. A machine according to claim 8 wherein said separate control means for operating said second stapler includes cam means controlled with the movement of said conveyor, and switch means controlled by said cam means and said blank for adding a reinforcing staple at each end of said row of staples placed along said overlapping edges by said first stapler.

10. A machine according to claim 8 wherein said separate means includes means responsive to the presence of said blank at a given location along said conveyor for stopping the operation of at least said first stapler.

11. A machine according to claim 8 wherein said separate control means includes means for operating said second stapler to staple a second row of staples through said overlapping edges to reinforce said first row of staples.

12. A machine for forming collapsed tubes from flat blanks comprising: an intermittently driven conveyor for moving said blanks through said machine while being formed into said collapsed tubes, guide means for holding opposite edges of said blanks in spaced overlapping relationship to each other, movable means for aligning at least the forward ends of the overlapping regions of said folded blanks, a first stitcher for placing a row of staples along and through said overlapping regions, means adjacent said stitcher for supporting a clincher for said staples below said overlapping regions and above the center of said blank, a second stitcher for placing a reinforcing staple along said overlapping regions adjacent at least one end of said row of said staples placed by said first stitcher, and means for synchronizing the movement of said conveyor, both said stitchers, and said aligning means.

References Cited in the file of this patent

UNITED STATES PATENTS

| | | |
|---|---|---|
| 1,130,744 | Labombarde | Mar. 9, 1915 |
| 1,174,965 | Brown | Mar. 14, 1916 |
| 1,323,965 | Craig | Dec. 2, 1919 |
| 1,331,460 | Morrison | Feb. 17, 1920 |
| 1,874,670 | Walker | Aug. 30, 1932 |
| 1,874,671 | Walker | Aug. 30, 1932 |
| 1,959,839 | Paxton | May 22, 1934 |
| 2,317,308 | Spiller | Apr. 20, 1943 |
| 2,747,189 | Fenimore | May 29, 1956 |